United States Patent
Tachibana et al.

(10) Patent No.: US 8,878,562 B2
(45) Date of Patent: Nov. 4, 2014

(54) SOLAR BATTERY PANEL INSPECTION APPARATUS FOR INSPECTING THE INSULATION STATE IN THE OUTER CIRCUMFERENTIAL INSULATING REGION OF A SOLAR BATTERY PANEL, METHOD OF INSPECTING, AND METHOD OF MANUFACTURING

(75) Inventors: Shinsuke Tachibana, Osaka (JP); Akira Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 447 days.

(21) Appl. No.: 13/264,524

(22) PCT Filed: Apr. 12, 2010

(86) PCT No.: PCT/JP2010/056530
§ 371 (c)(1),
(2), (4) Date: Oct. 14, 2011

(87) PCT Pub. No.: WO2010/119841
PCT Pub. Date: Oct. 21, 2010

(65) Prior Publication Data
US 2012/0028381 A1 Feb. 2, 2012

(30) Foreign Application Priority Data
Apr. 15, 2009 (JP) ................................. 2009-099217

(51) Int. Cl.
*G01R 31/26* (2014.01)
(52) U.S. Cl.
CPC .................................. *G01R 31/2605* (2013.01)
USPC .................................................... 324/761.01
(58) Field of Classification Search
CPC .. G01R 31/26; G01R 31/2605; G01R 31/405; H01L 31/042; H01L 31/02167; H01L 51/56; H01M 14/005
See application file for complete search history.

(56) References Cited

U.S. PATENT DOCUMENTS 4,464,823 A * 8/1984 Izu et al. .......................... 438/12
6,365,825 B1 * 4/2002 Hayashi et al. ............... 136/243
(Continued)

FOREIGN PATENT DOCUMENTS

| JP | 2000-323738 | 11/2000 |
|---|---|---|
| JP | 2001-345472 | 12/2001 |

(Continued)

OTHER PUBLICATIONS

International Search Report for PCT/JP2010/056530 mailed May 18, 2010.

*Primary Examiner* — Vinh Nguyen
(74) *Attorney, Agent, or Firm* — Nixon & Vanderhye P.C.

(57) ABSTRACT

A solar battery panel inspection apparatus is an apparatus for inspecting a solar battery panel including a transparent insulating substrate having a main surface, and a transparent electrode layer, a semiconductor photoelectric conversion layer and a back electrode layer which are sequentially stacked and having an outer circumferential insulating region in which the main surface is exposed, to check the insulation performance of the outer circumferential insulating region. The solar battery panel inspection apparatus includes the first terminal to be brought into contact with the back electrode layer; the second terminal to be brought into contact with a region of or in proximity to an outer circumferential edge of the outer circumferential insulating region; one or more third terminals to be brought into contact with the outer circumferential insulating region between the first terminal and the second terminal; a voltage application unit for applying a voltage each between two terminals selected from these terminals; and a current detection unit detecting a current flowing between the two terminals to which a voltage is applied.

17 Claims, 17 Drawing Sheets

(56) References Cited

U.S. PATENT DOCUMENTS

| | | | |
|---|---|---|---|
| 8,049,521 B2* | 11/2011 | Lu et al. | 324/691 |
| 8,319,513 B2* | 11/2012 | Shin et al. | 324/761.01 |
| 2001/0040453 A1 | 11/2001 | Toyomura et al. | |
| 2008/0001144 A1* | 1/2008 | Rand et al. | 257/40 |
| 2009/0272434 A1 | 11/2009 | Tachibana | |
| 2011/0203630 A1* | 8/2011 | Takano et al. | 136/244 |

FOREIGN PATENT DOCUMENTS

| | | |
|---|---|---|
| JP | 2005-236051 | 9/2005 |
| JP | 2007-234720 | 9/2007 |
| JP | 2008-109041 | 5/2008 |

* cited by examiner

SOLAR BATTERY PANEL INSPECTION APPARATUS FOR INSPECTING THE INSULATION STATE IN THE OUTER CIRCUMFERENTIAL INSULATING REGION OF A SOLAR BATTERY PANEL, METHOD OF INSPECTING, AND METHOD OF MANUFACTURING

This application is the U.S. national phase of International Application No. PCT/JP2010/056530 filed 12 Apr. 2010 which designated the U.S. and claims priority to JP 2009-099217 filed 15 Apr. 2009, the entire contents of each of which are hereby incorporated by reference.

TECHNICAL FIELD

The present invention relates to a solar battery panel inspection apparatus, a method of inspecting a solar battery panel, and a method of manufacturing a solar battery panel.

BACKGROUND ART

The conventional solar battery panel has a structure shown in Japanese Patent Laying-Open No. 2008-109041 (PTL 1). With attention to an example of a solar battery panel shown in PTL 1, FIG. 23 shows an enlarged cross sectional view in the vicinity of its end. A solar battery panel 100 includes a transparent insulating substrate 2 having a main surface 2$u$, and a transparent electrode layer 3, a semiconductor photoelectric conversion layer 4 and a back electrode layer 5 which are sequentially stacked on main surface 2$u$ of transparent insulating substrate 2. Solar battery panel 100 has an outer circumferential insulating region 21 in which main surface 2$u$ of transparent insulating substrate 2 is exposed in the vicinity of the outer circumference of transparent insulating substrate 2.

CITATION LIST

Patent Literature

PTL 1: Japanese Patent Laying-Open No. 2008-109041

SUMMARY OF INVENTION

Technical Problem

The structure as shown in FIG. 23 is fabricated by forming each layer which is followed by patterning by laser application. After fabrication of this structure, the structure is entirely sealed by resin (not shown) and a protection film.

As shown in FIG. 23, in outer circumferential insulating region 21, main surface 2$u$ of transparent insulating substrate 2 should be directly exposed and nothing should exist on main surface 2$u$. However, as shown in FIG. 24, a residue 23 of some material used during the patterning process may actually remain in outer circumferential insulating region 21. When the structure is entirely sealed by resin, such a residue 23 is also to be sealed. In addition, it is also conceivable that water may enter the resin layer after sealing. When the structure is sealed by resin in the state where the residue remains in outer circumferential insulating region 21, the entering water reacts with the residue to produce metal ions. In such a case, leakage occurs through the water.

Therefore, in order to avoid such leakage, it is necessary to provide a configuration in which there is no residue on the main surface of the outer circumferential insulating region and the outer circumferential insulating region is completely insulated.

Thus, the present invention aims to provide a solar battery panel inspection apparatus and a method of inspecting a solar battery panel for inspecting the insulation state in the outer circumferential insulating region of the solar battery panel. Furthermore, the present invention also aims to provide a method of manufacturing a solar battery panel which allows implementation of a solar battery panel having an outer circumferential insulating region for which the insulation state is ensured.

Solution to Problem

In order to accomplish the above-described aims, a solar battery panel inspection apparatus according to the present invention is an apparatus for inspecting a solar battery panel including a transparent insulating substrate having a main surface, and a transparent electrode layer, a semiconductor photoelectric conversion layer and a back electrode layer sequentially stacked on the main surface of the transparent insulating substrate, and having an outer circumferential insulating region in which the main surface of the transparent insulating substrate is exposed in proximity to an outer circumference of the transparent insulating substrate, to check an insulation performance of the outer circumferential insulating region. The solar battery panel inspection apparatus includes a first terminal to be brought into contact with the back electrode layer; a second terminal to be brought into contact with a region of and in proximity to an outer circumferential edge of the outer circumferential insulating region; one or more third terminals to be brought into contact with the outer circumferential insulating region between the first terminal and the second terminal; a voltage application unit for applying a voltage each between two terminals selected from the first terminal, the second terminal and the one or more third terminals; and a current detection unit detecting a current flowing between the two terminals to which a voltage is applied by the voltage application unit.

Advantageous Effects of Invention

According to the present invention, a voltage is applied to the outer circumferential insulating region, and thus, to be able to check whether a current flows or not. Accordingly, residues after removal in the middle of the process can be detected. Consequently, defective products can be discovered at an early stage, to perform removal, repair and the like of the defective products. Thus, wastes can be decreased to thereby allow improvement in productivity. Furthermore, terminals are optionally selected and brought into contact with three or more portions including the transparent electrode layer or the back electrode layer, the outer circumferential edge of the outer circumferential insulating region and a portion in proximity thereto, and the region sandwiched therebetween. Then, a voltage is applied thereto for each combination, and thus, to be able to check whether a current flows or not. Therefore, the insulation state in the outer circumferential insulating region can be closely inspected.

DESCRIPTION OF EMBODIMENTS

First Embodiment

Figure 1:
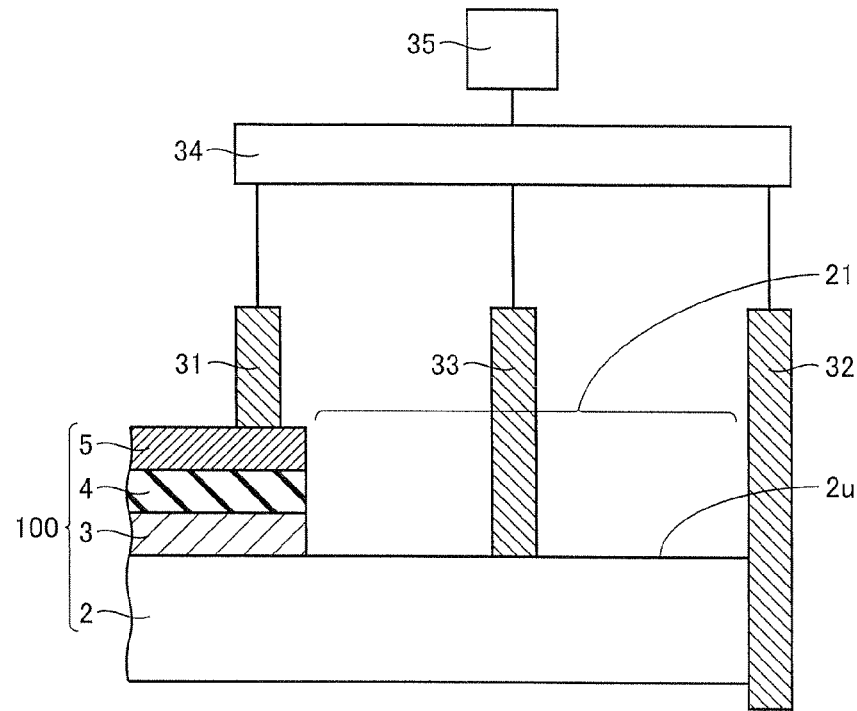
FIG. 1 is an explanatory diagram showing the state where an inspection is performed by a solar battery panel inspection apparatus in the first embodiment according to the present invention.
Figure 2:
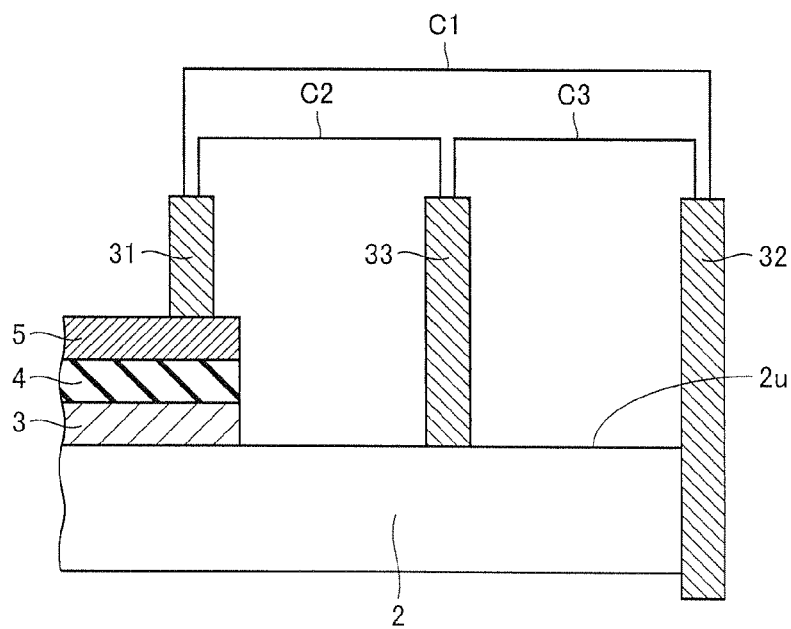
FIG. 2 is an explanatory diagram of the combination of terminals conceivable in the solar battery panel inspection apparatus in the first embodiment according to the present invention.

Referring to FIGS. 1 and 2, a solar battery panel inspection apparatus in the first embodiment according to the present invention will be hereinafter described. This solar battery panel inspection apparatus is an apparatus for inspecting a solar battery panel 100 including a transparent insulating substrate 2 having a main surface $2u$, and a transparent electrode layer 3, a semiconductor photoelectric conversion layer 4 and a back electrode layer 5 sequentially stacked on main surface $2u$ of transparent insulating substrate 2 and having an outer circumferential insulating region 21 in which main surface $2u$ of transparent insulating substrate 2 is exposed in proximity to an outer circumference of transparent insulating substrate 2, to check the insulation performance of outer circumferential insulating region 21. The solar battery panel inspection apparatus includes a first terminal 31 to be brought into contact with back electrode layer 5; a second terminal 32 to be brought into contact with a region of or in proximity to the outer circumferential edge of outer circumferential insulating region 21; one or more third terminals 33 to be brought into contact with outer circumferential insulating region 21 between first terminal 31 and second terminal 32; a voltage application unit 34 for applying a voltage each between two terminals selected from first terminal 31, second terminal 32 and one or more third terminals 33; and a current detection unit 35 detecting a current flowing between the two terminals to which a voltage is applied by voltage application unit 34. In other words, voltage application unit 34 shown in FIG. 1 can apply a voltage to each of combinations C1, C2 and C3 as shown in FIG. 2. Voltage application unit 34 and current detection unit 35 in FIG. 1 are schematically shown.

The solar battery panel inspection apparatus in the present embodiment allows detection of a product having insulation failure caused by residues after removal in the outer circumferential insulating region in the manufacturing process of a solar battery panel. Furthermore, terminals are brought into contact with three or more portions including the back electrode layer, the outer circumferential edge and a portion in proximity thereto and the region sandwiched therebetween, respectively, to which a voltage is applied for each combination, and thus, to be able to check whether a current flows or not. Therefore, the insulation state in the outer circumferential insulating region can be closely inspected.

Figure 3:
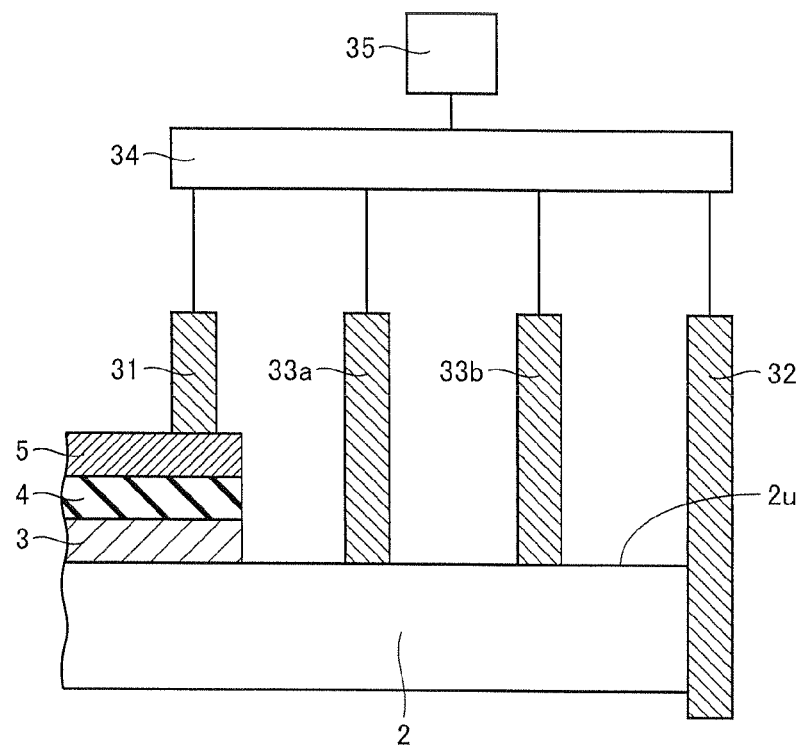
FIG. 3 is an explanatory diagram of an example in which two third terminals are employed in the solar battery panel inspection apparatus in the first embodiment according to the present invention.
Figure 4:
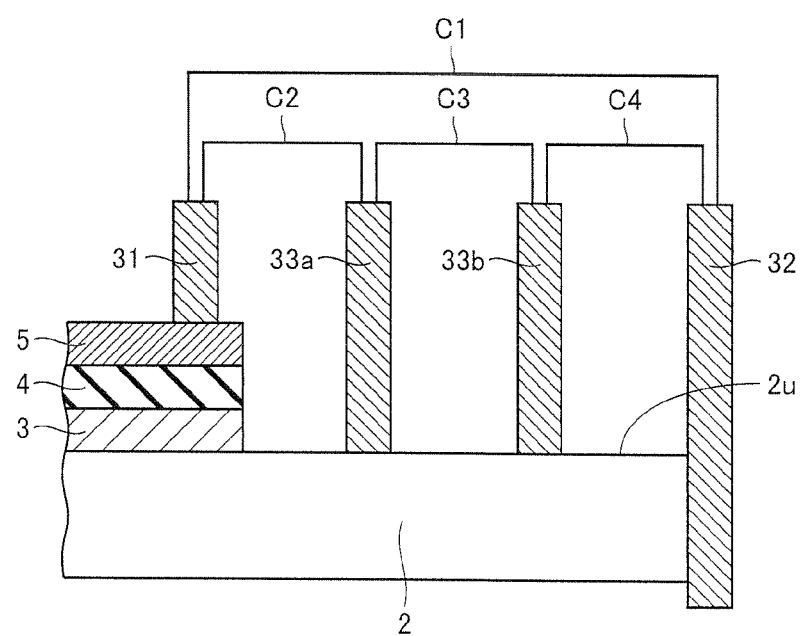
FIG. 4 is an explanatory diagram of the combination of terminals conceivable when two third terminals are employed in the solar battery panel inspection apparatus in the first embodiment according to the present invention.

Although FIGS. 1 and 2 each show an example in which the number of the third terminals is one, the inspection can be carried out with higher accuracy as the number of the third terminals is increased within the range allowed by the width dimension of the outer circumferential insulating region. By way of example, FIG. 3 shows an example in which the number of the third terminals is two, in which case third terminals 33a and 33b are disposed. In this case, voltage application unit 34 only needs to be able to apply a voltage to each of combinations C1, C2, C3, and C4 shown in FIG. 4. The number of combinations in which optional two terminals are selected from a total of four terminals including first terminal 31, second terminal 32 and third terminals 33a and 33b is six, which is mathematically represented by the following equation.

$$_4C_2 = 4!/(4-2)! \cdot 2!) = 24/4 = 6$$

Although it is preferable that a voltage can be separately applied to each of these six combinations, it is not essential that a voltage can be separately applied to each of these six combinations.

Assuming that the number of the third terminals is n, a generalized example will be hereinafter described. In this case, the first terminal and the second terminal are added to give a total number of terminals, which is represented as (n+2). The number of combinations in which optional two terminals are selected from these terminals is mathematically represented by the following equation.

$$_{n+2}C_2 = (n+2)!/(n! \cdot 2!)$$

Figure 5:
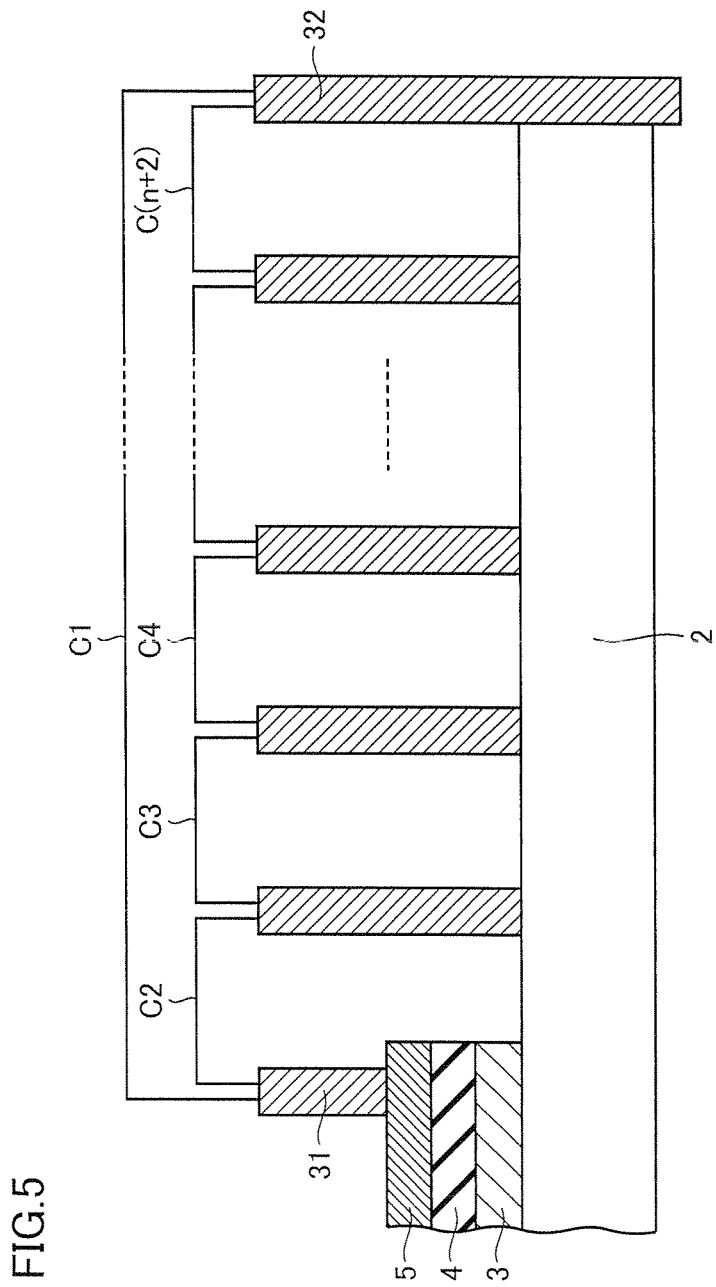
FIG. 5 is an explanatory diagram of the combination of terminals conceivable in the generalized model of the solar battery panel inspection apparatus in the first embodiment according to the present invention.

In fact, it is not essential in the present invention that a voltage can be separately applied to each pattern of all these combinations. As shown in FIG. 5, it is preferable that a voltage can be applied at least to combinations C2, C3, C4, . . . , C (n+2) of terminals adjacent to each other among the above-described combinations, and further, a voltage can be applied between the first terminal and the second terminal which is designated by C1.

Figure 6:
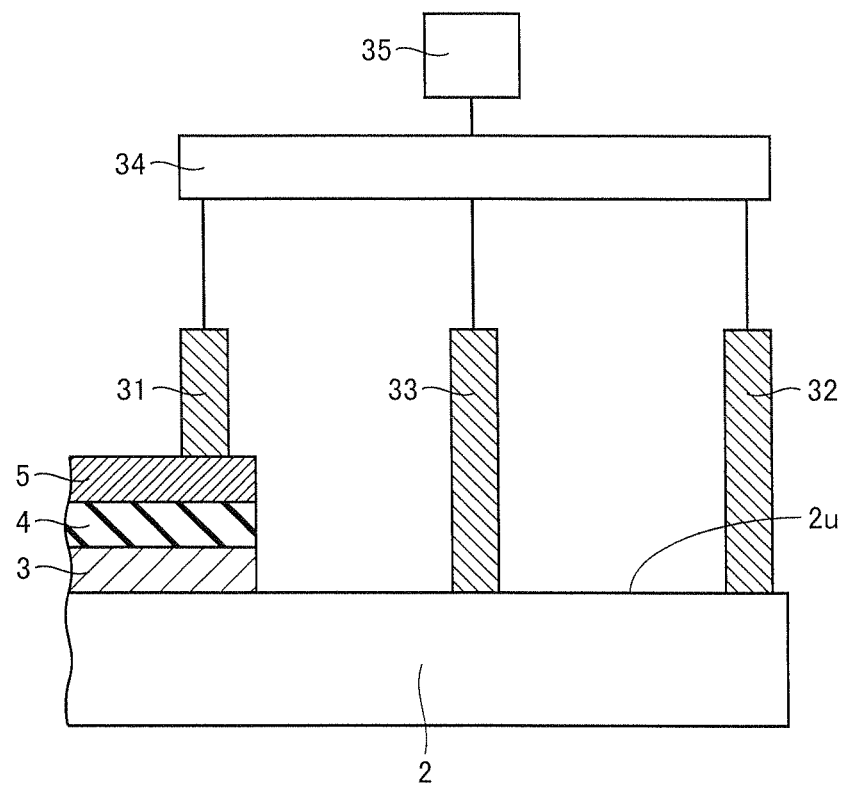
FIG. 6 is an explanatory diagram of an example in which the second terminal is brought into contact in the different manner in the solar battery panel inspection apparatus in the first embodiment according to the present invention.
Figure 7:
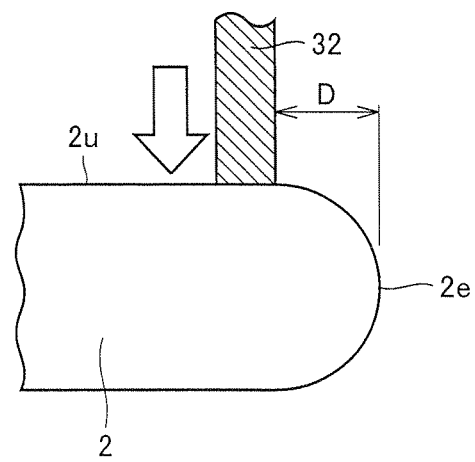
FIG. 7 is the first explanatory diagram showing the manner of bringing the second terminal into contact with a region of or in proximity to the outer circumferential edge.
Figure 8:
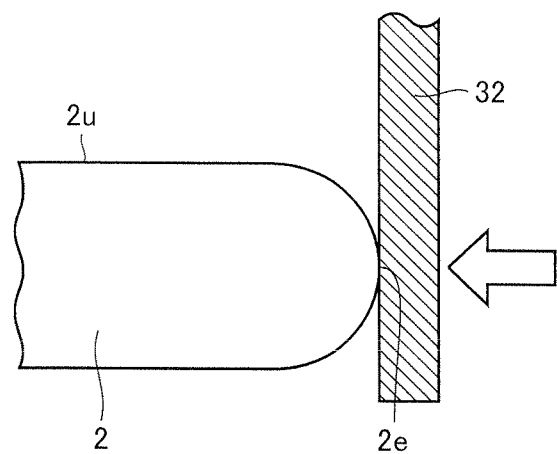
FIG. 8 is the second explanatory diagram showing the manner of bringing the second terminal into contact with a region of or in proximity to the outer circumferential edge.

Although second terminal 32 is brought into contact laterally with the end face of the outer circumferential edge in the example shown in each of FIGS. 1 and 2, the manner of contacting the terminal is not limited thereto. For example, as shown in FIG. 6, second terminal 32 may be brought into contact from above with main surface 2u in proximity to the outer circumferential edge of the outer circumferential insulating region. However, in the case where the second terminal is brought into contact from above, for the transparent insulating substrate having a rounded end face, the second terminal should be brought into contact with a flat portion of main surface 2u without contacting the rounded portion, as shown in FIG. 7. Thus, for example, a measurement is to be carried out at the position displaced backward from a real edge 2e by a distance D. In contrast, it is preferable that the second terminal is laterally brought into contact. This is because the second terminal can be reliably brought into contact with real edge 2e as shown in FIG. 8, regardless of whether the end face of the transparent insulating substrate is vertically flat or rounded. While FIGS. 7 and 8 each show an example in which the cross section of the edge of the transparent insulating substrate is in the shape of a complete semicircle, the same also applies to the case where the cross section of the edge has an irregular shape. Therefore, in the present invention, it may be preferable that the second terminal is intended to be brought into contact laterally with the outer circumferential edge of the outer circumferential insulating region.

In addition, not only completed solar battery panel 100 but also uncompleted solar battery panel 100 may be subjected to inspection by the solar battery panel inspection apparatus in the present embodiment. The same also applies to the embodiments described below.

Figure 9:
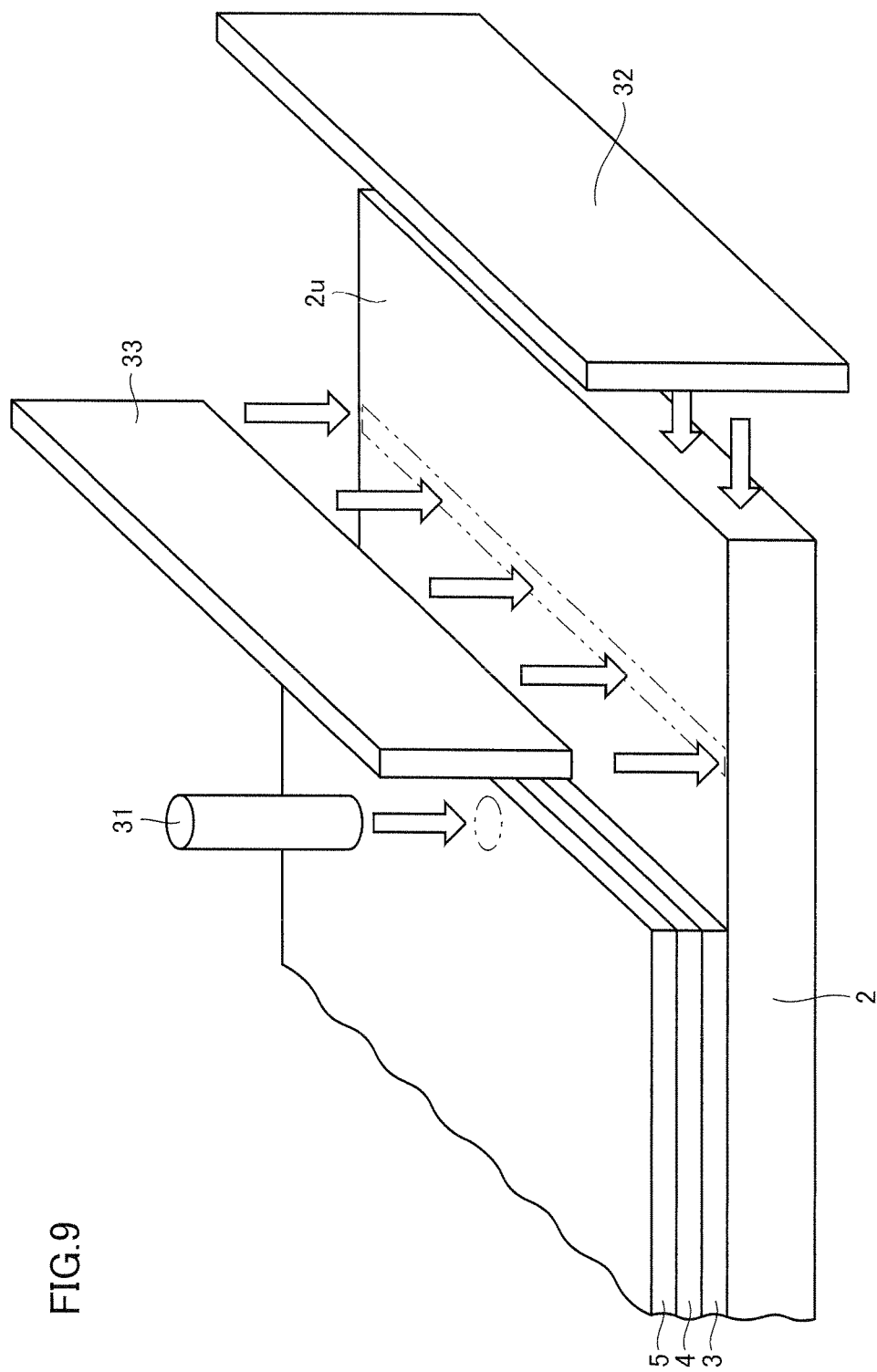
FIG. 9 is an explanatory diagram of the positional relationship between the solar battery panel and each terminal in a portion in proximity to the outer circumference of the solar battery panel.

Although first terminal 31, second terminal 32 and third terminal 33 each are shown as a rod-shaped member in each figure as mentioned above, it is preferable that second terminal 32 and third terminal 33 each are actually formed as a belt-shaped member extending long in the direction perpendicular to the surface of the paper showing the diagram. The first terminal may be a rod-shaped member. Although second terminal 32 and third terminal 33 each may be configured such that a plurality of rod-shaped members are arranged along the side of the solar battery panel, it is more preferable that a belt-shaped member is disposed in parallel to the side of the solar battery panel and brought into contact with the upper surface or the end face of the solar battery panel. FIG. 9 shows an example of the positional relationship between the solar battery panel and each terminal in a portion in proximity to the outer circumference of the solar battery panel. Thus, it is preferable that first terminal 31 formed as a rod-shaped member and second terminal 32 and third terminal 33 each formed as a belt-shaped plate member are brought into contact with the solar battery panel from their respective directions.

Figure 10:
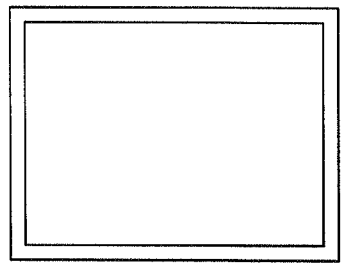
FIG. 10 is a plan view of the first example of the shape of each terminal.
Figure 11:
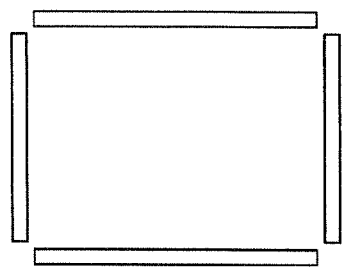
FIG. 11 is a plan view of the second example of the shape of each terminal.
Figure 12:
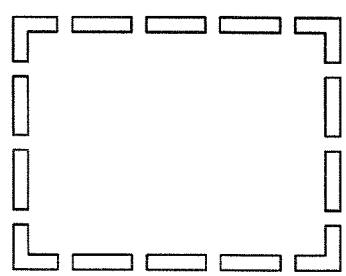
FIG. 12 is a plan view of the third example of the shape of each terminal.
Figure 13:
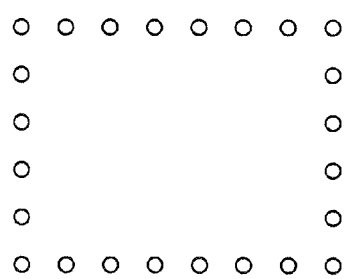
FIG. 13 is a plan view of the fourth example of the shape of each terminal.

It is to be noted that, as seen in plan view, the terminals may form a shape of a rectangular frame as shown in FIG. 10. This rectangular shape is sized such that the outer shape of the solar battery panel is exactly fit therewithin. Another example of arrangement of the terminals may be as shown in FIGS. 11, 12 and 13, each of which is formed in an approximately rectangular shape. However, when gaps are increased as in the example shown in each of FIGS. 12 and 13, it is more likely to fail to find a residue in the outer circumferential insulating region. Accordingly, it is preferable to employ a shape that is nearly completely rectangular as far as possible as in the example shown in each of FIGS. 10 and 11. However, even in the case where a completely rectangular shape as shown in FIG. 10 is employed, the terminals that are formed as a single integrated rectangular product may cause difficulties in production and maintenance. Accordingly, it is preferable that the terminals are configured such that the terminals can be separated for each side of the rectangle.

Second Embodiment

Figure 14:
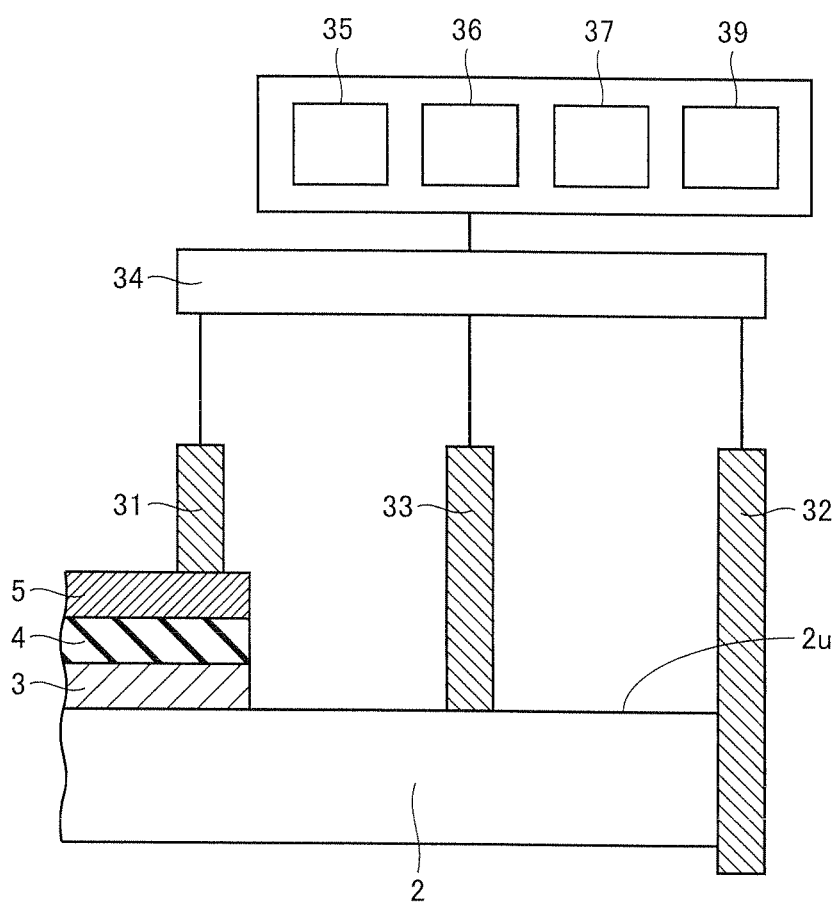
FIG. 14 is an explanatory diagram showing the state where an inspection is performed by a solar battery panel inspection apparatus in the second embodiment according to the present invention.
Figure 15:
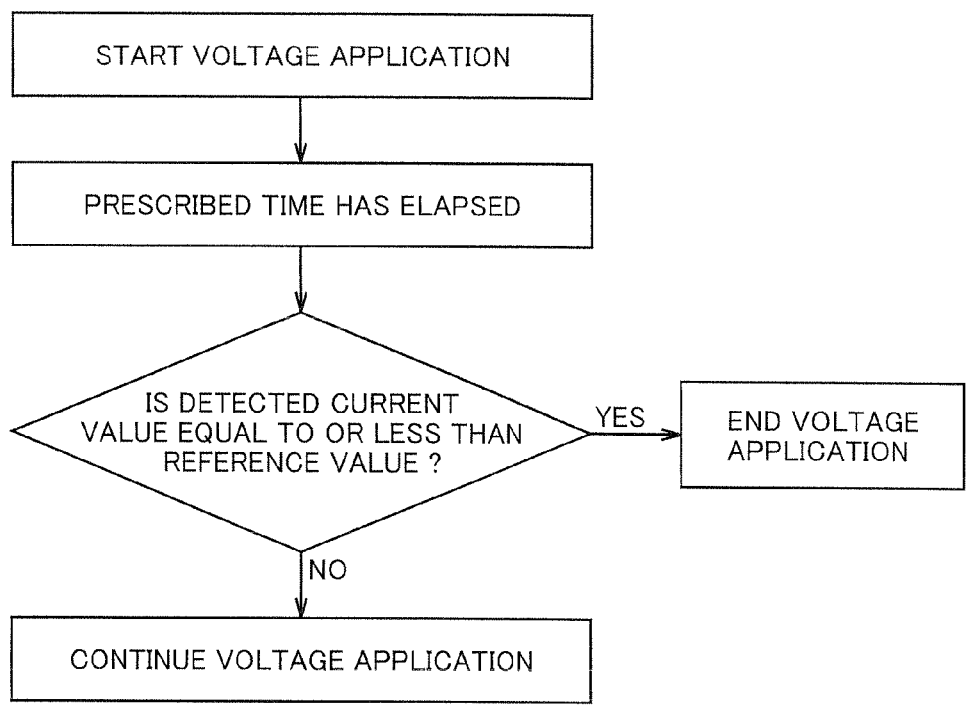
FIG. 15 is a flowchart illustrating the operation of the solar battery panel inspection apparatus in the second embodiment according to the present invention.

Referring to FIGS. 14 and 15, the solar battery panel inspection apparatus in the second embodiment according to the present invention will be hereinafter described.

Although the solar battery panel inspection apparatus in the present embodiment is basically the same as that described in the first embodiment, it further holds data of the reference value of the current. Furthermore, as shown in FIG. 14, the solar battery panel inspection apparatus includes a determination unit 36 for comparing the above-mentioned reference value with the value of the current detected by the current detection unit after a prescribed time has elapsed since start of voltage application by the voltage application unit, and based on the comparison result, determining whether the voltage application to the above-mentioned two terminals is to be continued or not. In FIG. 14, the data of the reference value of the voltage is held by a data holding unit 37, from which determination unit 36 can read the data as appropriate.

FIG. 15 shows a flowchart of the operation of the solar battery panel inspection apparatus in the present embodiment. If the current value detected by the current detection unit is equal to or less than the reference value after a prescribed time has elapsed since start of voltage application, the voltage application is ended. If not, the voltage application is further continued. In this case, by way of example, the voltage application is to be ended if "equal to or less than the reference value". However, the voltage application may be ended if "less than the reference value".

In the case where a residue exists on the surface of the outer circumferential insulating region, a high current is to flow through the residue when a voltage is applied between two terminals disposed with the residue interposed therebetween.

Consequently, the residue is increased in temperature due to the resistance heat. The residue increased in temperature is vaporized, and consequently, diffused. In this way, the residue is removed. In the present embodiment, since a determination unit is provided which serves to compare the reference value with the current value after a voltage is applied for a prescribed period of time, it can be determined whether removal of the residue is completed or not. When the residue does not exist at all or when removal of the residue is completed even if the residue exists, the current value becomes equal to or less than the reference value or becomes less than the reference value. Accordingly, the voltage application is ended. When the current value is greater than the reference value or is equal to or greater than the reference value, it is considered that the residue still remains in some portion between two terminals in spite of the voltage application. Accordingly, the voltage application is continued and the process of removing the residue is continued.

In the solar battery panel inspection apparatus in the present embodiment, not only the present condition is passively inspected, but also the above-described active removing process can be performed for the existing residue. Accordingly, the solar battery panel inspected by this solar battery panel inspection apparatus can be configured as a reliable solar battery panel containing no residue.

Furthermore, it is also preferable to provide a retry control unit 39 for causing voltage application unit 34 to apply a voltage higher than the immediately previously applied voltage in the case where it is determined that voltage application is to be continued as a result of the determination by determination unit 36. This configuration is preferable for the following reason. That is, when the determination unit determines that the voltage application is to be continued, not only the voltage application is continued simply using the same voltage, but also a voltage higher than the immediately previously applied voltage is applied. Consequently, the residue that cannot be fully removed during the previous voltage application can be more forcibly removed.

Third Embodiment

Figure 16:
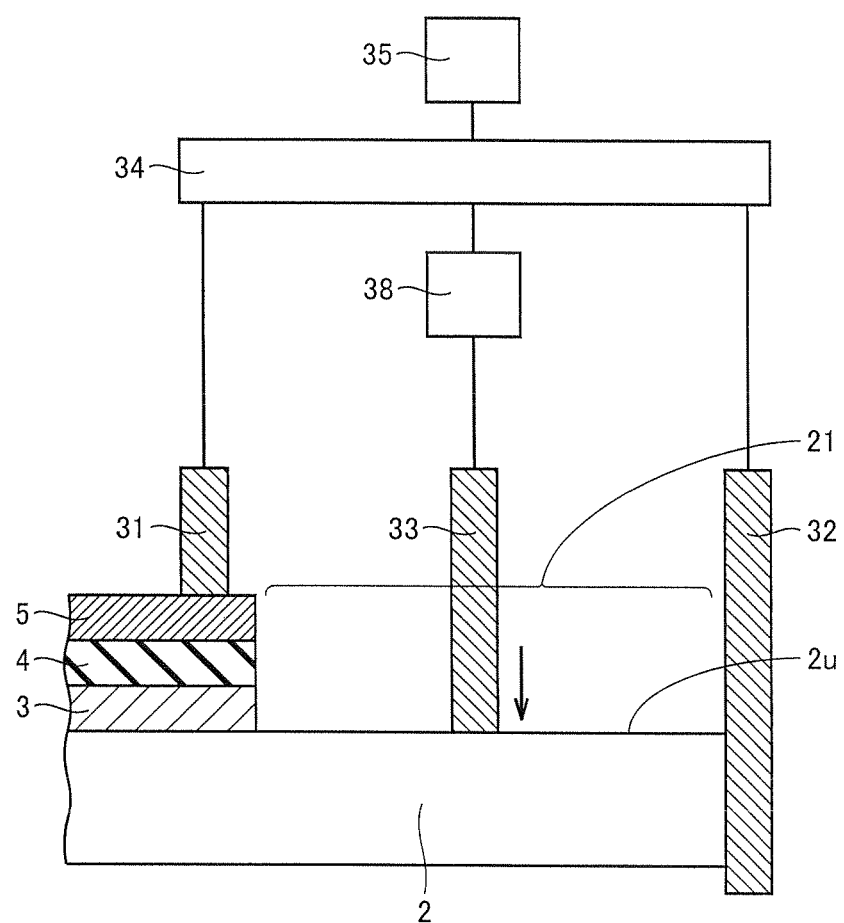
FIG. 16 is an explanatory diagram of the first state of the solar battery panel inspection apparatus in the third embodiment according to the present invention.
Figure 17:
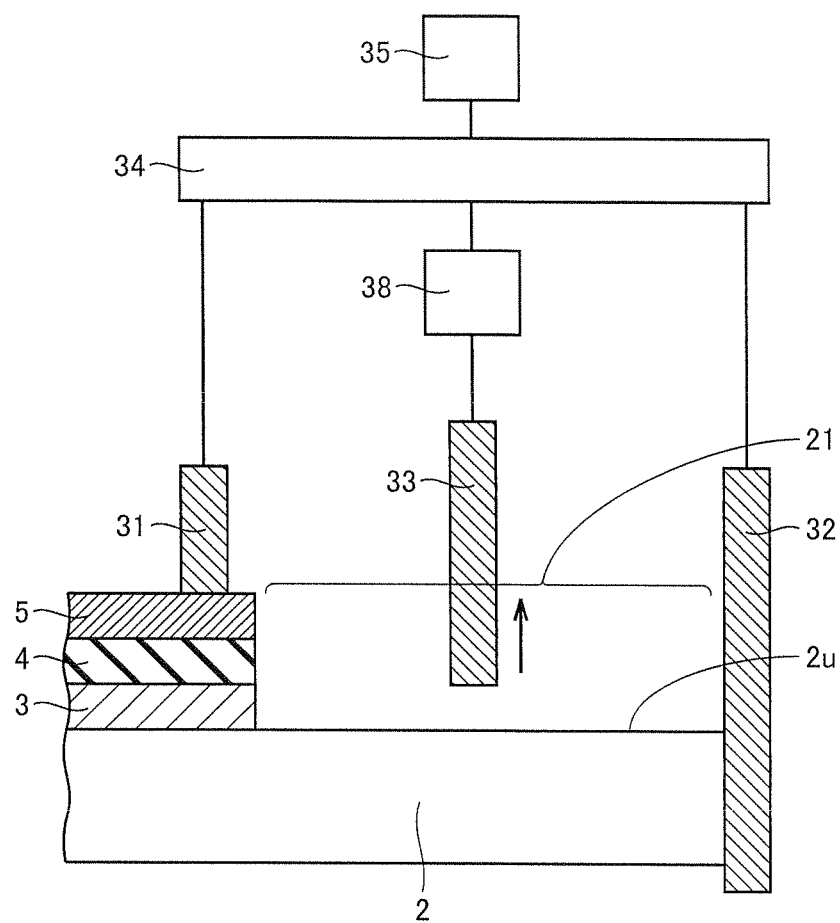
FIG. 17 is an explanatory diagram of the second state of the solar battery panel inspection apparatus in the third embodiment according to the present invention.

Referring to FIGS. 16 and 17, the solar battery panel inspection apparatus in the third embodiment according to the present invention will be hereinafter described.

Although the solar battery panel inspection apparatus in the present embodiment is basically the same as that described in the first embodiment, the solar battery panel inspection apparatus includes a third terminal switching mechanism 38, as shown in FIGS. 16 and 17, for switching all or one of the one or more third terminals between the first state in contact with outer circumferential insulating region 21 and the second state out of contact with outer circumferential insulating region 21, in the state where first terminal 31 remains in contact with back electrode layer 5 and second terminal 32 remains in contact with transparent insulating substrate 2. FIG. 16 shows the first state and FIG. 17 shows the second state. Although third terminal switching mechanism 38 may be able to perform only unidirectional switching from the first state to the second state or from the second state to the first state, it may also be able to perform bidirectional switching between the first state and the second state. In the case where the third terminal is lowered from above and brought into contact with outer circumferential insulating region 21, third terminal switching mechanism 38 can be implemented as a mechanism which raises and lowers the third terminal.

In the present embodiment, the third terminal switching mechanism is provided, so that the third terminal can be switched between the state in contact with the outer circumferential insulating region and the state out of contact with the outer circumferential insulating region. Therefore, when a voltage is applied between the first terminal and the second terminal, the third terminal located therebetween can be kept out of contact with the main surface of the transparent insulating substrate. Therefore, leakage can be prevented from occurring due to the third terminal during the voltage application between the first terminal and the second terminal, and thus, the insulation state can be inspected with more accuracy.

Figure 18:
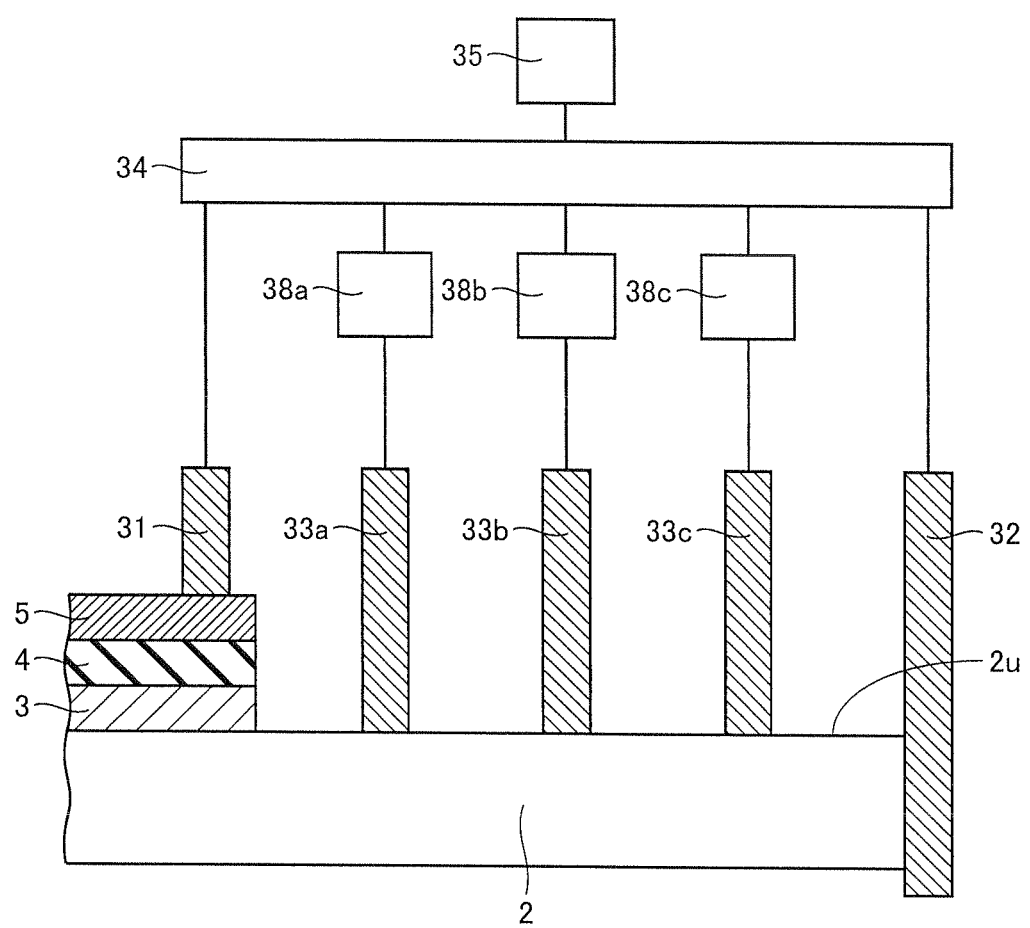
FIG. 18 is an explanatory diagram of a modification of the solar battery panel inspection apparatus in the third embodiment according to the present invention.

It is preferable that the number of the one or more third terminals is two or more, and the third terminal switching mechanism has a structure that allows switching between the above-described first state and the above-described second state independently for each of the third terminals. In other words, it is preferable to have a structure as shown in FIG. 18. In the example shown in FIG. 18, third terminals 33a, 33b and 33c are provided with third terminal switching mechanisms 38a, 38b and 38c, respectively, in which case third terminals 33a, 33b and 33c can be individually raised and lowered. Although the number of third terminals is three in the example shown in FIG. 18, the number of third terminals may be two. Furthermore, the number of third terminals may be four or more.

It should be however noted that too many third terminals might complicate the structure. Furthermore, too many third terminals may be inconvenient for appropriately arranging the third terminals and the gaps between the terminals with respect to the width of the outer circumferential insulating region. In light of the foregoing, practically, it is preferable that the number of the above-described one or more third terminals is two.

Thus, when the number of third terminals is two or more, the third terminals can be individually switched between the contacted state and the non-contacted state. Accordingly, when a voltage is applied between any pair of terminals, redundant third terminals located therebetween can be kept out of contact with main surface 2u. Consequently, leakage caused by the third terminal located therebetween can be avoided, so that the residue can be checked with more accuracy.

It is preferable that each of the one or more third terminals is a belt-shaped conductive member disposed in an approximately rectangular shape. In other words, as has already been explained with reference to FIGS. 9 to 11, it is preferable that each of the third terminals is a belt-shaped conductive member. The first to third terminals each only need to be a conductive member, but may also be a metal member, for example. The above-described shape allows the process of checking and removing the residue to be efficiently and accurately performed over the entire solar battery panel.

Example

Figure 19:
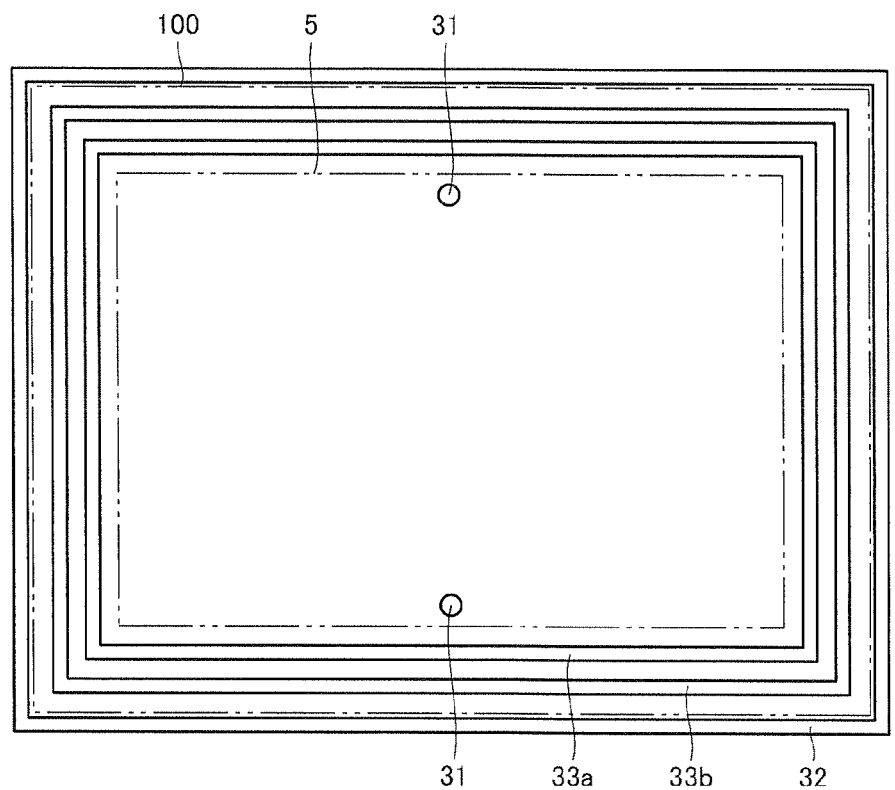
FIG. 19 a plan view showing the positional relationship between respective terminals in the solar battery panel inspection apparatus described as an example.
Figure 20:
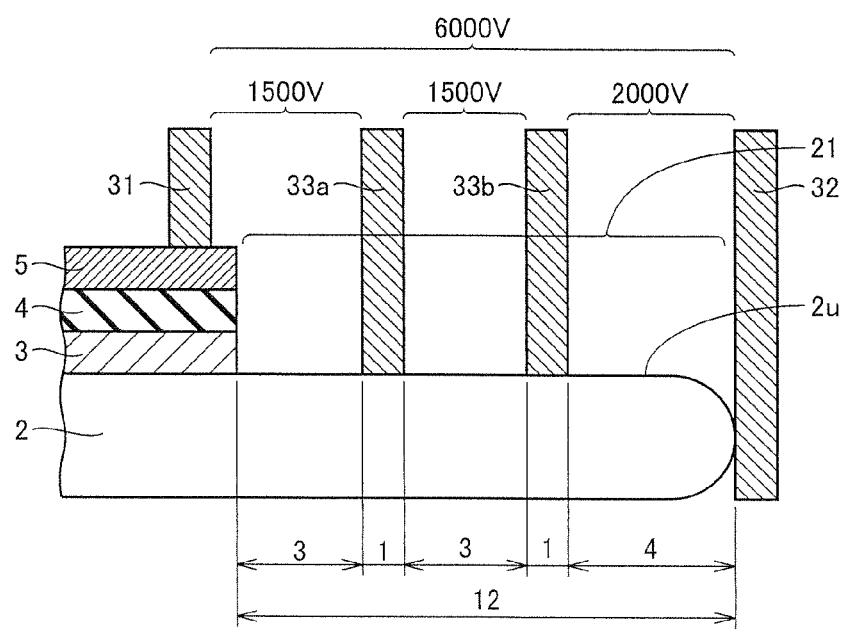
FIG. 20 is a cross sectional view showing the positional relationship between respective terminals in the solar battery panel inspection apparatus described as an example.

Referring to FIGS. 19 and 20, a specific example of the solar battery panel inspection apparatus corresponding to the first embodiment will be described. As shown in FIG. 19, two cylindrical components are provided each as first terminal 31 of the solar battery panel inspection apparatus. Third terminals 33a and 33b and second terminal 32 are arranged sequentially in this order from inside so as to surround the outside of these components in a rectangular shape. Second terminal 32 is disposed in close contact with the outer circumference of solar battery panel 100 that is to be inspected, and is also arranged so as to surround this outer circumference in a rectangular shape. First terminal 31 is disposed in the position along each of two parallel sides facing each other within the region in which back electrode layer 5 of the solar battery panel is disposed. Third terminal 33a is disposed to form a rectangular shape so as to surround the outside of the region including back electrode layer 5 of the solar battery panel and to be located at a distance from the outside of this region.

In FIG. 20, the unit of the numerical value of the dimension line shown below transparent insulating substrate 2 is "mm". As shown in FIG. 20, the width of the outer circumferential insulating region is 12 mm. Third terminals 33a and 33b each have a thickness of 1 mm. The gap between first terminal 31 and third terminal 33a is 3 mm; the gap between third terminal 33a and third terminal 33b is 3 mm; and the gap between third terminal 33b and second terminal 32 is 4 mm.

A voltage of 1500V was applied between first terminal 31 and third terminal 33a.

A voltage of 1500V was applied between third terminal 33a and third terminal 33b.

A voltage of 2000V was applied between third terminal 33b and second terminal 32.

A voltage of 6000V was applied between first terminal 31 and second terminal 32.

The order of applying these voltages is not limited to the above-described order. Voltages may be applied in any other order.

By using the solar battery panel inspection apparatus having the above-described configuration, the insulation state in the outer circumferential insulating region could be closely inspected. Furthermore, by applying such a high voltage for a certain period of time during the inspection, the residue could be vaporized and removed.

In this example, the configuration shown in each of the second and third embodiments may be employed as appropriate.

Fourth Embodiment

Although an explanation has been made in each of the above-described embodiments with attention to the aspect as the invention related to the inspection apparatus, the invention related to the inspection method may also be conceived. Thus, a method of inspecting a solar battery panel will be described in the fourth embodiment. The flowchart of the method of inspecting a solar battery panel in the present embodiment is shown in FIG. 21.

This method of inspecting a solar battery panel is a method for inspecting a solar battery panel including a transparent insulating substrate having a main surface, and a transparent electrode layer, a semiconductor photoelectric conversion layer and a back electrode layer sequentially stacked on the main surface of the transparent insulating substrate, and having an outer circumferential insulating region in which the main surface of the transparent insulating substrate is exposed in proximity to an outer circumference of the transparent insulating substrate, to check an insulation performance of the outer circumferential insulating region. This method of inspecting a solar battery panel employs an apparatus including the first terminal to be brought into contact with the back electrode layer, the second terminal to be brought into contact with a region of or in proximity to an outer circumferential edge of the outer circumferential insulating region, and one or more third terminals to be brought into contact with the outer circumferential insulating region between the first terminal and the second terminal. This method of inspecting a solar battery panel includes a step S1 of bringing the first terminal into contact with the back electrode layer; a step S2 of bringing the second terminal into contact with a region of or in proximity to the outer circumferential edge; a step S3 of bringing one or more third terminals selected from the one or more third terminals into contact with the outer circumferential insulating region; and a step S4 of applying a voltage between two terminals selected from the first terminal, the second terminal and the one or more third terminals; a step S5 of detecting a current flowing between the two terminals to which a voltage is applied.

The "apparatus" used in this inspection method may be a solar battery panel inspection apparatus described in the first embodiment. The meaning of each term is as described in the first to third embodiments.

Figure 21:
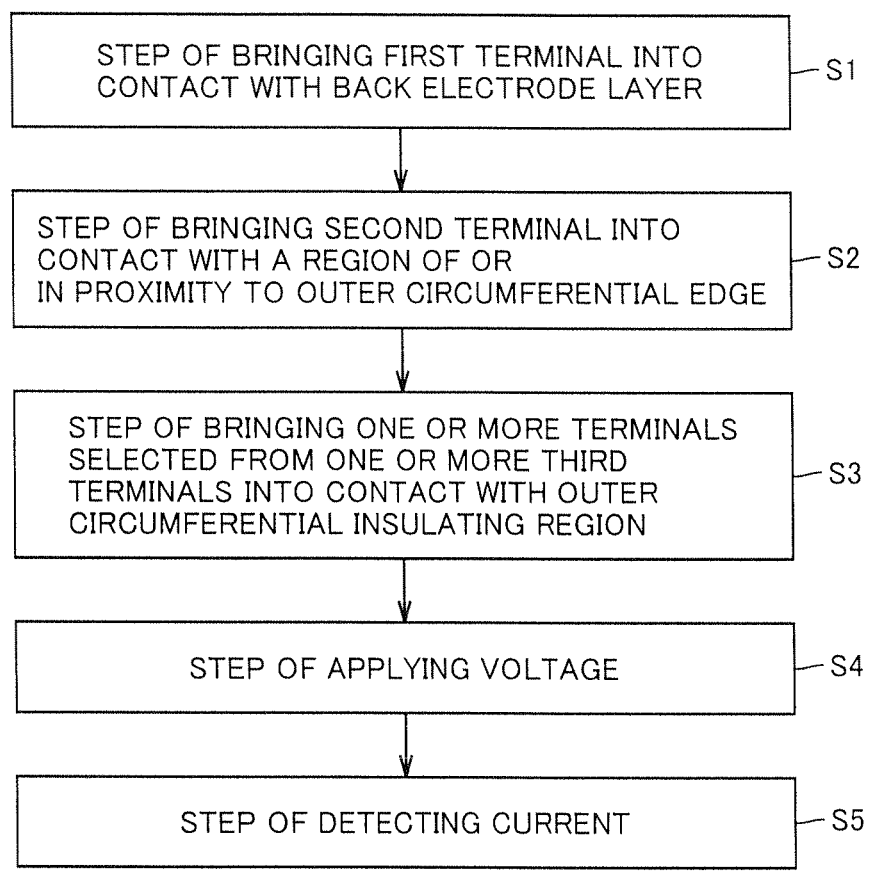
FIG. 21 is a flowchart of a method of inspecting a solar battery panel in the fourth embodiment according to the present invention.

Steps S1 to S3 may not be necessarily performed in the order as shown in FIG. 21. Steps S1 to S3 may be performed in the order different from that shown in FIG. 21, and two or three steps of steps S1 to S3 may be simultaneously performed. It is to be noted that two required terminals to be subjected to voltage application need to be brought into contact with the corresponding portions before performing step S4 of applying a voltage. Step S4 may be performed more than once for each combination of terminals. Each time the combination of selected terminals in step S4 is changed, as a preparation thereto, required step(s) of steps S1 to S3 may be performed. Step S5 of detecting a current is performed after voltage application is started in step S4 of applying a voltage and before the end of the voltage application. Therefore, step S5 is performed in a part of the time zone during which step S4 is being performed. In the case where step S4 is performed more than once for each different combination of terminals, step S5 is also performed the same number of times.

In the method of inspecting a solar battery panel in the present embodiment, defective insulation in the outer circumferential insulating region can be detected at an early stage within the process of manufacturing the solar battery panel. In addition, the terminals can be brought into contact with three or more portions including the back electrode layer, the outer circumferential edge and a portion in proximity thereto, and the region sandwiched therebetween, to which a voltage is applied for each combination thereof, and thus, to be able to check whether a current flows or not. Therefore, the insulation state in the outer circumferential insulating region can be closely inspected.

Preferably in the above-described invention, in step S2 of bringing the second terminal into contact, the second terminal is brought into contact laterally with the outer circumferential edge of the outer circumferential insulating region. This is because when step S2 is performed as described above, the terminal can be reliably brought into contact with the edge regardless of whether the cross-sectional shape of the outer circumferential edge of the outer circumferential insulating region is vertically flat or rounded. In the first embodiment, the same has already been described from the viewpoint as the invention of the inspection apparatus.

Figure 22:
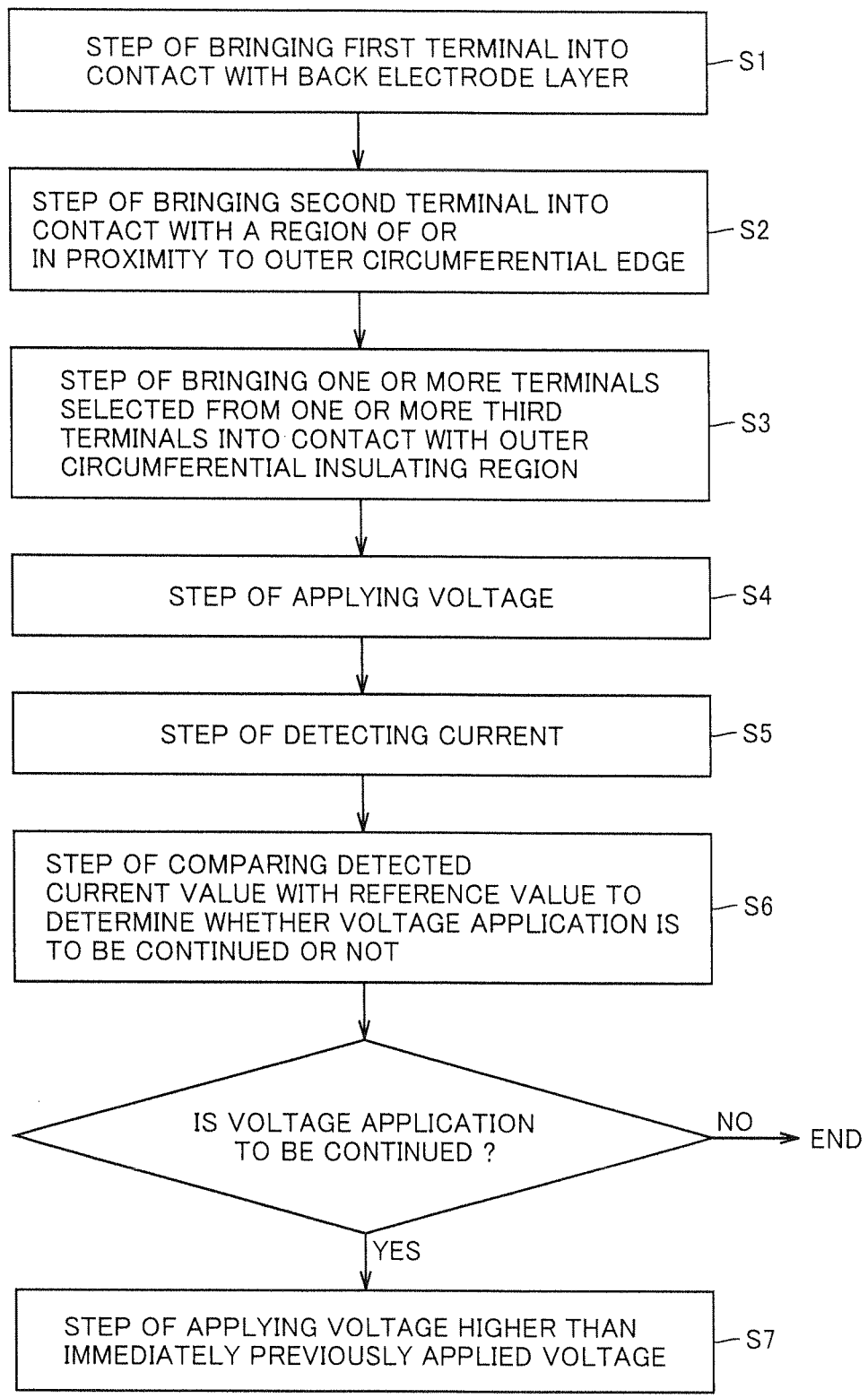
FIG. 22 is a flowchart of a preferable example of the method of inspecting a solar battery panel in the fourth embodiment according to the present invention.
Figure 23:
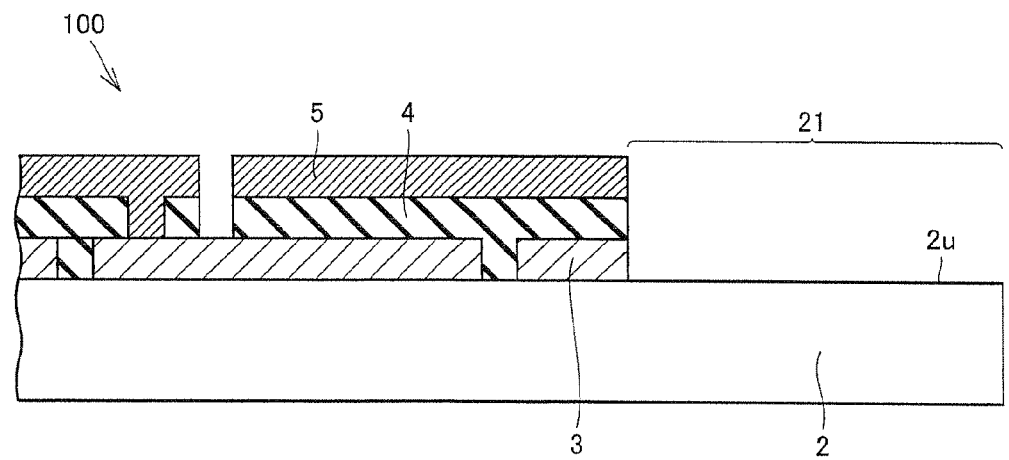
FIG. 23 is an enlarged cross sectional view of and around the outer circumferential insulating region of the solar battery panel according to the conventional technique.
Figure 24:
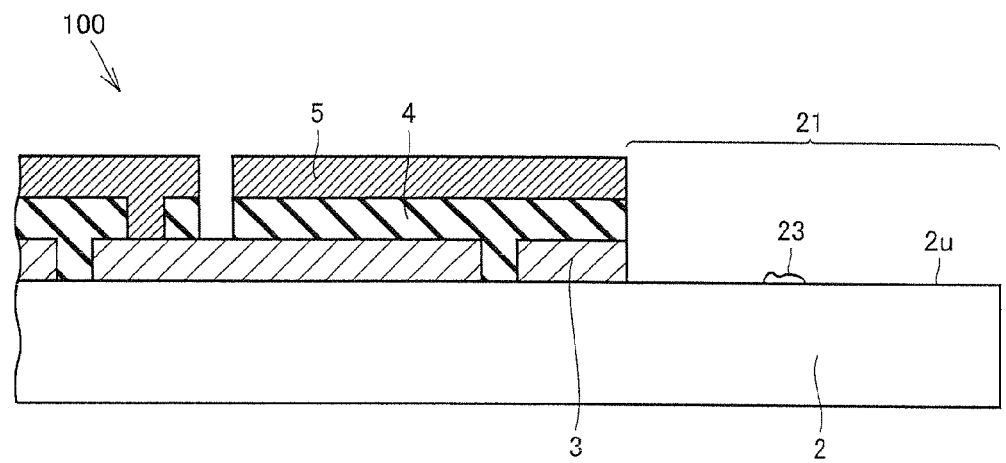
FIG. 24 is an enlarged cross sectional view of an example in which a residue exists in the outer circumferential insulating region of the solar battery panel according to the conventional technique.

Preferably in the above-described invention, as shown in FIG. 22, step S5 of detecting a current is followed by step S6 of comparing the detected current value with the reference value that is held in advance, and based on the result, determining whether the voltage application to the two terminals is to be continued or not.

Preferably in the above-described invention, when it is determined as a result of the determining step S6 that voltage application is to be continued, step S7 is then performed in which the voltage application unit applies a voltage higher than the immediately previously applied voltage. Such a step S7 is preferable for the following reason. That is, when the residue cannot be fully removed by the first voltage application, the voltage application is continued not only using the same voltage, but also using a voltage higher than the immediately previously applied voltage, with the result that the residue that cannot be fully removed during the previous voltage application can be more forcibly removed.

FIG. 22 shows that the process "ends" when the voltage application is not continued, which merely means that voltage application between the two terminals is ended. Thus, the voltage application in step S4 between two terminals which are differently combined may be continuously performed. In this case, when these new two terminals are not yet brought into contact with the target object, the step of bringing the terminals into contact with the target object, that is, any necessary step of steps S1 to S3, is performed, which is followed by step S4 of voltage application.

Preferably in the above-described invention, before step S4 of applying a voltage, there is a terminal exclusion step (not shown) in which the terminal in contact with the outer circumferential insulating region between the above-mentioned two terminals is brought out of contact with the outer circumferential insulating region. In the terminal exclusion step, for example, the first state shown in FIG. 16 is switched to the second state shown in FIG. 17.

Alternatively, for instance, in the example shown in FIG. 20, before performing step S4 of applying a voltage between first terminal 31 and second terminal 32, third terminals 33a and 33b in contact with the outer circumferential insulating region between first terminal 31 and second terminal 32 are separated from main surface 2u, which is performed as the terminal exclusion step. Before performing step S4 of applying a voltage between first terminal 31 and third terminal 33b, third terminal 33a is separated from main surface 2u, which is performed as the terminal exclusion step. Before performing step S4 of applying a voltage between third terminal 33a and second terminal 32, third terminal 33b is separated from main surface 2u, which is performed as the terminal exclusion step. In fact, the terminal existing between other terminals is separated from main surface 2u by the terminal exclusion step, which is performed only in the case where this terminal is in contact with the outer circumferential insulating region. When this terminal is not in contact with the outer circumferential insulating region in the first place, the terminal exclusion step does not need to be performed.

Preferably in the above-described invention, the number of the one or more third terminals is two. This is because it is appropriate that the number of the third terminals is approximately two in order to arrange all of one or more third terminals within the limited width of the outer circumferential insulating region while conducting a certain level of close inspection without excessively complicating the structure of the apparatus.

Preferably in the above-described invention, each of the one or more third terminals is a belt-shaped conductive member disposed in an approximately rectangular shape. This is because when each of the one or more third terminals is a belt-shaped conductive member, each terminal is disposed along the side of the solar battery panel and brought into contact therewith, so that an inspection can be performed with efficiency and accuracy. In this regard, the same has already been described in the first embodiment from the viewpoint as the invention of the inspection apparatus.

Fifth Embodiment

Although an explanation has been made in each of above-described embodiments with attention to the aspect as the invention related to the inspection apparatus or the inspection method, the invention related to the method of manufacturing a solar battery panel may also be conceived. Thus, the method of inspecting a solar battery panel will be described in the fifth embodiment.

The method of manufacturing a solar battery panel includes the first step of preparing a photoelectric conversion element including a transparent insulating substrate having a main surface, and a transparent electrode layer, a semiconductor photoelectric conversion layer and a back electrode layer sequentially stacked on the main surface of the transparent insulating substrate and having an outer circumferential insulating region in which the main surface of the transparent insulating substrate is exposed in proximity to the outer circumference of the transparent insulating substrate; and the second step of performing an inspection by the solar battery panel inspection apparatus described in any one of the first to third embodiments, to check the photoelectric conversion element.

The method of manufacturing a solar battery panel includes the first step of preparing a photoelectric conversion element including a transparent insulating substrate having a main surface, and a transparent electrode layer, a semiconductor photoelectric conversion layer and a back electrode layer sequentially stacked on the main surface of the transparent insulating substrate, and having an outer circumferential insulating region in which the main surface of the transparent insulating substrate is exposed in proximity to an outer circumference of the transparent insulating substrate; and the second step of performing the method of inspecting a solar battery panel described in the fourth embodiment, to check the photoelectric conversion element.

The first step of "preparing a photoelectric conversion element" includes not only the act of obtaining a completed photoelectric conversion element from other suppliers, but also the act of obtaining a glass substrate having a transparent electrode layer formed therein from other suppliers and performing only the process after the process of forming a semiconductor photoelectric conversion layer to prepare a photoelectric conversion element. In the second step, the "photoelectric conversion element" prepared in the first step is regarded as a yet-to-be-inspected solar battery panel and subjected to inspection. It is to be noted that, during the inspection, not only the present state is passively detected, but also the active removal process using a current may be performed for the residue as described above.

In any of the above-described methods of manufacturing a solar battery panel, even if the residue causing a decrease in the dielectric withstand voltage remains on the main surface of the outer circumferential insulating region, a voltage for inspection is applied in the second step to thereby allow the residue to be vaporized and then removed. Consequently, it becomes possible to achieve a solar battery panel in which the insulation state of the outer circumferential insulating region is ensured.

سixth Embodiment

Although an explanation has been made in the above-described first to fifth embodiments basically with regard to the case where first terminal 31 is brought into contact with back electrode layer 5, first terminal 31 may be brought into contact with transparent electrode layer 3. The configuration having the first terminal brought into contact with the transparent electrode layer will then be described as the sixth embodiment according to the present invention.

Figure 25:
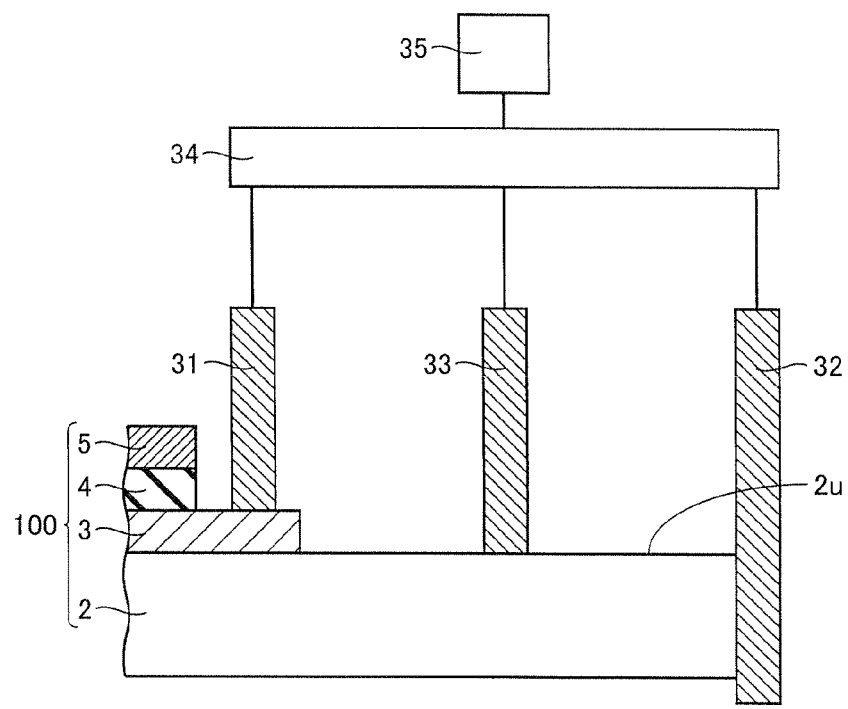
FIG. 25 is an explanatory diagram showing the state where an inspection is performed by the solar battery panel inspection apparatus in the sixth embodiment according to the present invention.

The solar battery panel manufacturing apparatus in the present embodiment has a configuration for bringing first terminal 31 into contact with transparent electrode layer 3, as shown in FIG. 25. It is to be noted that FIG. 25 is a diagram corresponding to FIG. 1 used in the description of the first embodiment.

The present embodiment is different from the first embodiment only in the following two points. That is, transparent electrode layer 3 of solar battery panel 100 protrudes toward the outer circumference with respect to semiconductor photoelectric conversion layer 4 and back electrode layer 5, and first terminal 31 is to be brought into contact with transparent electrode layer 3. The features other than those described above are the same as those described in the first embodiment.

Also in the present embodiment, the same functions and effects as those in the first embodiment can be achieved.

Similarly to the present embodiment, the another embodiment may also employ the structure in which transparent electrode layer 3 of solar battery panel 100 protrudes toward the outer circumference with respect to semiconductor photoelectric conversion layer 4 and back electrode layer 5, in which first terminal 31 may be brought into contact with transparent electrode layer 3. According to this configuration, similar functions and effects can also be achieved.

The above-described embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a solar battery panel inspection apparatus, a method of inspecting a solar battery panel, and a method of manufacturing a solar battery panel.

REFERENCE SIGNS LIST 2 transparent insulating substrate, 2u main surface (of a transparent insulating substrate), 2e real edge (of a transparent insulating substrate), 3 transparent electrode layer, 4 semiconductor photoelectric conversion layer, 5 back electrode layer, 21 outer circumferential insulating region, 23 residue, 31 first terminal, 32 second terminal, 33, 33a, 33b, 33c third terminal, 34 voltage application unit, 35 current detection unit, 36 determination unit, 37 data holding unit, 38 third terminal switching mechanism, 39 retry control unit, 100 solar battery panel.

The invention claimed is:

1. A solar battery panel inspection apparatus for inspecting a solar battery panel including a transparent insulating substrate having a main surface, and a transparent electrode layer, a semiconductor photoelectric conversion layer and a back electrode layer sequentially stacked on said main surface of said transparent insulating substrate, and having an outer circumferential insulating region in which said main surface of said transparent insulating substrate is exposed in proximity to an outer circumference of said transparent insulating substrate, to check an insulation performance of said outer circumferential insulating region, said solar battery panel inspection apparatus comprising:
a first terminal to be brought into contact with said transparent electrode layer or said back electrode layer;
a second terminal to be brought into contact with a region of or in proximity to an outer circumferential edge of said outer circumferential insulating region;
one or more third terminals to be brought into contact with said outer circumferential insulating region between said first terminal and said second terminal;
a voltage application unit for applying a voltage each between two terminals selected from said first terminal, said second terminal and said one or more third terminals; and
a current detection unit detecting a current flowing between said two terminals to which a voltage is applied by said voltage application unit.

2. The solar battery panel inspection apparatus according to claim 1, wherein said second terminal is to be brought into contact laterally with the outer circumferential edge of said outer circumferential insulating region.

3. The solar battery panel inspection apparatus according to claim 1
comprising a determination unit for comparing a reference value with a value of the current detected by said current detection unit after a prescribed time has elapsed since start of voltage application by said voltage application unit, and based on a result, determining whether voltage application to said two terminals is to be continued or not.

4. The solar battery panel inspection apparatus according to claim 3, comprising a retry control unit for said voltage application unit applying a voltage higher than an immediately previously applied voltage when it is determined as a result of determination by said determination unit that voltage application is to be continued.

5. The solar battery panel inspection apparatus according to claim 1, comprising a third terminal switching mechanism for switching all or one of said one or more third terminals between a first state in contact with said outer circumferential insulating region and a second state out of contact with said outer circumferential insulating region, in a state where said first terminal remains in contact with said transparent electrode layer or said back electrode layer and said second terminal remains in contact with said transparent insulating substrate.

6. The solar battery panel inspection apparatus according to claim 5, wherein the number of said one or more third terminals is two or more, and said third terminal switching mechanism has a structure that allows switching between said first state and said second state independently for each of said third terminals.

7. The solar battery panel inspection apparatus according to claim 1, wherein the number of said one or more third terminals is two.

8. The solar battery panel inspection apparatus according to claim 1, wherein each of said one or more third terminals is a belt-shaped conductive member disposed in an approximately rectangular shape.

9. A method of inspecting a solar battery panel for inspecting a solar battery panel including a transparent insulating substrate having a main surface, and a transparent electrode layer, a semiconductor photoelectric conversion layer and a back electrode layer sequentially stacked on said main surface of said transparent insulating substrate, and having an outer circumferential insulating region in which said main surface of said transparent insulating substrate is exposed in proximity to an outer circumference of said transparent insulating substrate, to check an insulation performance of said outer circumferential insulating region, said method employing an apparatus including
a first terminal to be brought into contact with said transparent electrode layer or said back electrode layer, a second terminal to be brought into contact with a region of or in proximity to an outer circumferential edge of said outer circumferential insulating region, and one or more third terminals to be brought into contact with said outer circumferential insulating region between said first terminal and said second terminal, said method comprising the steps of:

bringing said first terminal into contact with said transparent electrode layer or said back electrode layer;

bringing said second terminal into contact with a region of or in proximity to said outer circumferential edge;

bringing one or more third terminals selected from said one or more third terminals into contact with said outer circumferential insulating region;

applying a voltage each between two terminals selected from said first terminal, said second terminal and said one or more third terminals; and detecting a current flowing between said two terminals to which a voltage is applied.

10. The method of inspecting a solar battery panel according to claim 9, wherein said step of bringing said second terminal into contact is a step of bringing said second terminal into contact laterally with the outer circumferential edge of said outer circumferential insulating region.

11. The method of inspecting a solar battery panel according to claim 9, comprising the step of comparing a value of the detected current with a reference value held in advance after said step of detecting a current, and based on a result, determining whether voltage application to said two terminals is to be continued or not.

12. The method of inspecting a solar battery panel according to claim 11, comprising the step of applying a voltage higher than an immediately previously applied voltage when it is determined as a result of said determining step that voltage application is to be continued.

13. The method of inspecting a solar battery panel according to claim 9, comprising a terminal exclusion step of bringing a terminal in contact with said outer circumferential insulating region between said two terminals out of contact with said outer circumferential insulating region, before said step of applying a voltage.

14. The method of inspecting a solar battery panel according to claim 9, wherein the number of said one or more third terminals is two.

15. The method of inspecting a solar battery panel according to claim 9, wherein each of said one or more third terminals is a belt-shaped conductive member disposed in an approximately rectangular shape.

16. A method of manufacturing a solar battery panel, comprising:

a first step of preparing a solar battery panel including a transparent insulating substrate having a main surface, and a transparent electrode layer, a semiconductor photoelectric conversion layer and a back electrode layer sequentially stacked on said main surface of said transparent insulating substrate, and having an outer circumferential insulating region in which said main surface of said transparent insulating substrate is exposed in proximity to an outer circumference of said transparent insulating substrate; and a second step of performing an inspection by the solar battery panel inspection apparatus according to claim 1, to check said solar battery panel.

17. A method of manufacturing a solar battery panel, comprising:

a first step of preparing a solar battery panel including a transparent insulating substrate having a main surface, and a transparent electrode layer, a semiconductor photoelectric conversion layer and a back electrode layer sequentially stacked on said main surface of said transparent insulating substrate, and having an outer circumferential insulating region in which said main surface of said transparent insulating substrate is exposed in proximity to an outer circumference of said transparent insulating substrate; and a second step of performing the method of inspecting a solar battery panel according to claim 9, to check said solar battery panel.

* * * * *